Aug. 4, 1964        M. E. A. MULLER        3,143,030
MULTIPLE PRONGED CONNECTOR
Filed July 28, 1960
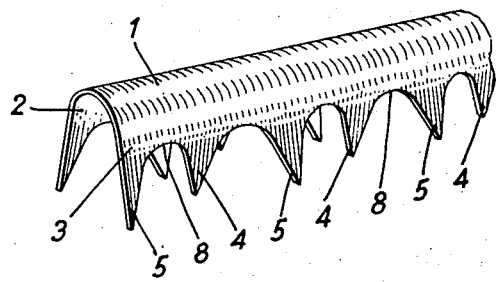
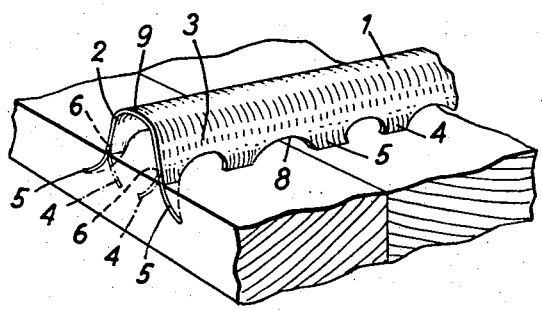
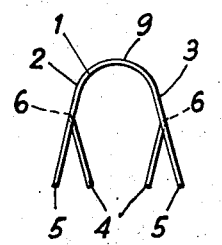
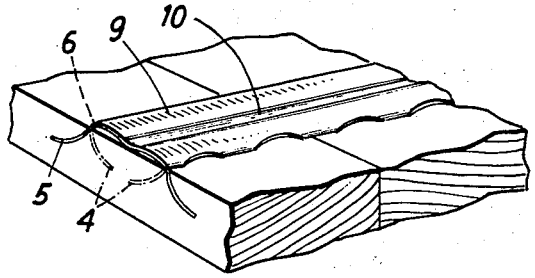
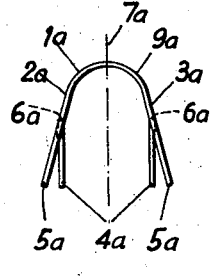
Inventor
Max Ernst Andreas Muller

United States Patent Office 3,143,030
Patented Aug. 4, 1964

3,143,030
MULTIPLE PRONGED CONNECTOR
Max Ernst Andreas Muller, Rue des Coteaux 10,
Cortaillod, Switzerland
Filed July 28, 1960, Ser. No. 45,869
Claims priority, application Switzerland July 29, 1959
6 Claims. (Cl. 85—13)

The present invention relates to novel improvements in connectors and is particularly directed to a connector having a substantially U-shaped body portion with the opposing leg portions terminating in teeth which are formed and structurally related to the leg portions and the body in a novel manner to produce a new and extremely efficient anchoring action.

Thus, the present invention appertains to a connector having toothed or serrated edge portions which protrude obliquely outward with respect to the central plane of the body portions.

Such connectors are used in most varied manners for reinforcing or connecting parts of material which can be nailed, or for connecting any fittings to pieces of such material. In the case of connectors of this type known up to the present time, the teeth of each edge of the leg portions lie in a plane, the two planes making an acute angle with each other. When these connectors are hammered into a workpiece, the two rows of teeth penetrate essentially into the material in the plane of their edge parts. This has the disadvantage that the amount of material remaining between the teeth is relatively small so that, particularly in case of tensile stressing, there is the danger that these parts of the material would be sheared off and that the connectors would act as a saw.

Furthermore, since deformation of the teeth which penetrate into the material is effected for all practical purposes only by places of greater hardness and does not occur at all in the case of entirely homogeneous materials, such connectors oppose only slight resistance to being pulled out. Finally, these known connectors are of very poor stiffness in their longitudinal direction, which also contribute to it being possible to remove them from the material without any great expenditure of force.

Furthermore, there have also been proposed U-shaped connectors with edge portions having set teeth, in which connection, however, the two side pieces are parallel to the central plane. When such connectors are hammered in, the point of attachment of the teeth naturally always remains at the same distance from the center plane of the connector so that the setting is not positive but depends essentially merely on the nature of the wood. Thus it can not be avoided that, for instance in the case of soft woods, there is practically no deformation of the teeth at all and only a wide slit is produced in which the connector is only loosely fastened. Furthermore, these previously known connectors have the disadvantage that due to the unsatisfactory—since non-positive—deformation of the teeth they emerged from the bottom side of the board when used with relatively thin boards.

The object of the present invention is to provide a connector in which the teeth which have penetrated into the workpiece are positively bent out of their original plane, whereby a very substantial, firm anchoring of the connector in the material can be obtained and furthermore, particularly in the case of hard materials, a greater stiffness in the longitudinal axis of the connector can be realized.

The connector, in accordance with the invention, is characterized by the fact that a part of the teeth are bent inward, this bend in a particularly suitable embodiment being such that the inner teeth of both edge parts lie at least approximately parallel to the central plane of the connector.

The foregoing and ancillary objects are attained by this invention the preferred embodiments of which are set forth in the following description and illustrated in the accompanying drawing, wherein FIG. 1 is a perspective view of one form of connector;
FIG. 2 is a front elevational view of the form of FIG. 1;
FIG. 3 is a front elevational view of another form of connector;
FIG. 4 is a perspective view of the connector showing it in a half-way hammered in position in two abutting pieces of material, and,
FIG. 5 is a perspective view of the connector showing it in its final anchored position in the two pieces of material.

The connector in accordance with FIGS. 1 and 2 comprises a U-shaped body portion 1, which is bent less than 180°, and is provided with opposing leg portions 2 and 3 which protrude obliquely toward the outside so that these leg portions make an oblique angle with each other. Each leg portion is toothed on its free edge, each second tooth 4 being bent inwardly while the remaining teeth 5 lie in the plane of the leg edge portion.

The body portion, while shown as U-shaped may be V-shaped.

Instead of each second tooth being bent inward, only each third or fourth tooth could be so bent or else entire groups of teeth could be bent in this manner. Furthermore, the bent teeth or groups of teeth could lie opposite each other or could be staggered with respect to each other.

When a connector of this type is driven into material, the outwardly extending teeth 5 enter the material in the plane of the leg portions while the inwardly extending teeth 4, due to the fact that their attachment points 6 lie in the plane of the outwardly extending teeth move constantly further apart upon the penetration of the connector into the material, are bent off and thus, as shown in FIG. 4, surround a certain portion, lying between them, of the material while the outwardly extending teeth bend over toward the outside. This bending over of the inwardly extending or inner teeth is thus not only a consequence of the wedge action of the parts of the material which are pressed together and compressed between the teeth which protrude in different directions, but a positive action which is controlled by the removal of the attachment points 6 from the central plane. As a result of this envelopment and as a result of the spreading of the two rows of teeth of each edge of the leg portions which occurs upon the hammering-in of the connector, there is obtained a particularly firm anchoring of the connector in the material. The extent and manner of the bending of the teeth depends, of course, in the case of non-homogeneous materials such as wood, on the structure of the material at the place of penetration of the tooth in question. Since this structure differs from one point of penetration to another, the teeth also bend differently and thus do not always envelope, for instance in the case of wood, the same fiber group, which also contributes to a very intimate anchoring.

In the case of hard material, there is a certain danger in the case of connectors in accordance with the first embodiment that the inwardly extending or inner teeth 4 will penetrate only slightly into the material or will lie only on the surface of the material. This danger is eliminated in the case of the embodiment shown in FIG. 3 in the manner that the inner teeth 4a of the two leg portions 2a and 3a are at least approximately parallel to the central plane 7a of the connector. In this position these inner rows of teeth, before the hammering of the connector, are at least approximately at right angles to the surface of the material so that during the critical phase, i.e., at the commencement of the hammering, they definitely penetrate into the material, even if the material is relatively hard. As in the example in accordance with FIGS. 1 and 2, the outer rows of teeth at least at the beginning of the hammering of the connector, enter the material in the plane of the corresponding edge portions whereby the attachment points 6a of the inwardly extending or inner teeth 4a move further and further away from each other. As a result there takes place the aforementioned bending over of the inner teeth 4a toward each other and the aforementioned clamp-like enveloping of parts of the material by the two rows of inner teeth, in which connection in this embodiment the depth of penetration of the inner rows of teeth is naturally greater so that more material is also enveloped, without, due to the positive control of the bending of the teeth, these teeth penetrating too deep into the material in the direction of hammering of the connector and thus, in the case of thin boards of material, protruding from the lower side.

It is clear that with connectors of this type the inner teeth protrude beyond a plane passing through the tooth tips of the outer teeth. This is without practical importance in the case of smaller connectors, but in the case of larger connectors, can lead to the inner teeth, upon the hammering-in of the connector, acting as guides so that practically only the outer teeth are deformed. In order to prevent this undesired deformation, particularly in the case of large connectors, it is advisable to shorten the inner teeth by such an amount that the tips of all the teeth lie in one and the same plane.

In the case of softer materials, upon either suitable hammering or rolling-in of the connectors, the edge parts 8 lying between the teeth also penetrate into the material so that only an insignificant deformation, if any, of the central part 9 of the connector takes place.

Conditions are different in the case of harder materials where the edge parts 8 of the teeth protruding in different directions penetrate only slightly, if at all. In these cases, there remains on the top side an excess of material formed by the central part 9 which is deformed upon the knocking or rolling-in. This deformation takes place in the form of a kinking 10 (FIG. 5) extending in the longitudinal axis of the connector and which effects a substantial stiffening of the connector strip. Due to this stiffening of the connector strip, the latter opposes greater resistance to being torn out since the resistance to being torn out of the teeth arranged over a considerable length of the connector strip must be overcome. The prerequisite for such a deformation or kinking taking place in the longitudinal axis of the connector is of course that the length, developed in cross-section, of the untoothed portion of the connector, i.e., of the central part 9, be greater than the distance between two opposite outer tooth tips which determine the two places of penetration.

The connector described can be developed in this connection as a double connector, in which case two of the connectors shown are arranged with mirror symmetry with teeth pointing away from each other and connected with each other. Furthermore, it is also possible to connect a connector originally with a fastening part, for instance a nail or the like.

Another use of such a connector is the use as corner connector, in which connection teeth are provided only at the two ends, while the central portion is free of teeth and flexible, so that this corner connector can also be used as a hinge.

In this way it is possible by the bending of a part of the teeth, preferably in such a manner that the inner rows of teeth lie at least approximately parallel to the central plane of the connector, to obtain a very considerable improvement in the anchoring of the connector in the workpiece.

I claim:

1. A connector for driving into a material to penetrate it and secure two pieces of material together comprising an elongated body of a generally U-shaped cross section and being substantially symmetrical about a central plane with the legs of the U joined by a connector portion of constant arcuate configuration and terminating in side edges and spaced teeth depending from said side edges with alternate teeth forming an acute angle with each other, and providing a row of inner and outer teeth, said connector portion presenting a concave surface toward said teeth and the teeth in said inner row being bent and extending inwardly from said side edges and disposed in longitudinal alignment with each other, the teeth in said other row being disposed in alignment with each other to positively spread said inner and outer row of teeth in a constantly increasing angle with respect to each other as they are driven into a material.

2. The connector of claim 1 wherein said second teeth are disposed substantially parallel to said central plane.

3. The connector of claim 1 wherein said second teeth are shorter than said first teeth and all of said teeth have lower pointed ends lying in a common plane disposed normal to said central plane.

4. The connector of claim 1 wherein the cross-sectional extent of said body is greater than the spacing between tips of said first teeth at opposite sides of the connector.

5. The connector of claim 1 wherein said second teeth are shorter than said first teeth and all of said teeth have lower pointed ends lying in a common plane disposed normal to said central plane, the cross-sectional extent of said body being greater than the spacing between tips of said first teeth at opposite sides of the connector.

6. The connector of claim 5 wherein said second teeth are disposed substantially parallel to said central plane.

References Cited in the file of this patent

UNITED STATES PATENTS

| 458,319 | Merriam | Aug. 25, 1891 |
| 2,349,547 | Gisondi | May 23, 1944 |
| 3,049,042 | De Lynn | Aug. 14, 1962 |

FOREIGN PATENTS

| 354,828 | Great Britain | Aug. 17, 1931 |
| 704,413 | France | Feb. 23, 1931 |
| 1,022,419 | France | Dec. 17, 1952 |
| 859,385 | Germany | Oct. 23, 1952 |